United States Patent
Bartlett et al.

(10) Patent No.: US 12,503,070 B2
(45) Date of Patent: Dec. 23, 2025

(54) METHOD AND APPARATUS FOR CONTROLLING AN ACTUATABLE PROTECTION DEVICE WITH ROUGH TERRAIN AND AIRBORNE DETECTION

(71) Applicant: ZF FRIEDRICHSHAFEN AG, Friedrichshafen (DE)

(72) Inventors: Charles A. Bartlett, Commerce Township, MI (US); Andreas Fleckner, Radolfzell (DE); Harald Pfriender, Radolfzell (DE); Kiran Balasubramanian, Canton, MI (US); Huahn-Fern Yeh, Novi, MI (US); Julian Scherer, Radolfzell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 205 days.

(21) Appl. No.: 18/266,906

(22) PCT Filed: Jan. 7, 2021

(86) PCT No.: PCT/IB2021/050086
§ 371 (c)(1),
(2) Date: Jun. 13, 2023

(87) PCT Pub. No.: WO2022/148989
PCT Pub. Date: Jul. 14, 2022

(65) Prior Publication Data
US 2024/0101060 A1    Mar. 28, 2024

(51) Int. Cl.
*B60R 21/0132*    (2006.01)
*B60R 21/01*    (2006.01)

(52) U.S. Cl.
CPC ............... *B60R 21/0132* (2013.01); *B60R 2021/01272* (2013.01); *B60R 2021/01322* (2013.01);
(Continued)

(58) Field of Classification Search
CPC ...... B60R 21/0132; B60R 2021/01272; B60R 2021/01322; B60R 2021/01325; B60R 2021/01327
See application file for complete search history.

(56) References Cited

U.S. PATENT DOCUMENTS

9,555,758 B2 * 1/2017 Le Merrer ............ B60R 21/013
2007/0017726 A1 1/2007 Takemura
(Continued)

FOREIGN PATENT DOCUMENTS

EP    2289753 A1    2/2011

OTHER PUBLICATIONS

Toyota, "Seatbelt Pretensioner and Force Limiter," accessed May 22, 2025: https://www.youtube.com/watch?v=0jqOOFs9-7o. (Year: 2016).*

(Continued)

*Primary Examiner* — Mark L. Greene
(74) *Attorney, Agent, or Firm* — ROSSI, KIMMS & McDOWELL LLP

(57) ABSTRACT

According to one aspect, a vehicle safety system includes an actuatable controlled restraint (ACR) comprising a seatbelt for restraining a vehicle occupant. The ACR is actuatable to control payout and retraction of the seatbelt. The system also includes a controller configured to determine operating conditions of the vehicle and to control the actuation of the ACR in response to the determined operating conditions of the vehicle. The ACR has a normal restraint condition and an enhanced restraint condition, the controller being configured to actuate the ACR from the normal restraint condition to the enhanced restraint condition in response to determining abnormal driving conditions of the vehicle.

14 Claims, 7 Drawing Sheets

(52) U.S. Cl.
CPC .............. *B60R 2021/01325* (2013.01); *B60R 2021/01327* (2013.01)

(56) References Cited

U.S. PATENT DOCUMENTS

2014/0324296 A1  10/2014  Laoufi et al.
2015/0100208 A1   4/2015  Wogel et al.

OTHER PUBLICATIONS

PCT/IB2021/050086 International Preliminary Report on Patentablity Issued Jul. 4, 2023.

* cited by examiner

METHOD AND APPARATUS FOR CONTROLLING AN ACTUATABLE PROTECTION DEVICE WITH ROUGH TERRAIN AND AIRBORNE DETECTION

CROSS REFERENCES TO RELATED APPLICATIONS

This application filed under 35 U.S.C § 371 is a national phase application of International Application Serial Number PCT/IB2021/050086, filed Jan. 7, 2021, the subject matter of which are incorporated herein by reference in its entirety.

TECHNICAL FIELD

This disclosure relates generally to a method and apparatus for controlling an actuatable vehicle occupant protection device. More particularly, this disclosure relates to a method and apparatus for detecting in rough terrain and/or airborne vehicle conditions and, in response, controlling the actuation of an actuatable controlled restraint, such as a motorized seatbelt retractor.

BACKGROUND

Vehicle safety systems include a central control unit, sometimes referred to as an airbag control unit ("ACU"). The ACU utilizes sensors, both local to the ACU and remote from the ACU, to detect the occurrence of crash events involving the vehicle and to determine whether those events warrant the activation of actuatable restraints, such as airbags and seatbelt retractors. The sensors utilized by the ACU can include accelerometers and other sensors, such as impact sensors, seatbelt buckle switches, seat pressure switches, steering angle sensors, etc. Using data from these sensors, the ACU can determine the occurrence of vehicle crash events and can perform discrimination algorithms to classify the crash event as being one of a particular type. The ACU can actuate the actuatable restraints according to the particular type of crash event.

For vehicle safety systems, it is desirable to discriminate amongst the various crash events in which a vehicle can be involved. To "discriminate" a crash event can mean to classify the crash event as being of one particular type of crash event and distinguish that crash event from other types of crash events. If the vehicle safety system can discriminate or identify the crash event as being of one particular type, the actuatable restraints can be actuated in a manner tailored to that particular type of crash event.

"Crash events," as used herein, can be used to encompass various events involving the vehicle. For example, crash events can be collisions or impacts in which the vehicle collides with, impacts, or otherwise engages different types of structures. These crash events can be collisions with a deformable barrier, such as another vehicle, or collisions with a non-deformable barrier, such as a tree or utility pole. As another example, crash events can also involve events, such as rollover events, where vehicle impacts result from the rolling over of the vehicle. Rollover events can result from a vehicle sliding sideways and striking a curb, from sliding or otherwise moving off the side of the road down an embankment or ditch, or from sliding or otherwise moving off the side of the road up a ramp, such as a hill.

Vehicle safety systems can be configured or adapted to discriminate those events for which deployment of the actuatable restraints is desired ("deployment events") from those events for which deployment of the actuatable restraints is not desired ("non-deployment events"). Crash discrimination entails determining the type of event, e.g., deformable barrier, non-deformable barrier, front impact crash, rear impact crash, side impact crash, oblique crash, offset crash, rollover, etc. Crash discrimination also entails determining the severity of the crash and implementing safing functions that act as checks to ensure that the actuatable restraints are deployed in a safe manner.

Misuse events are events where a vehicle is in an unconventional manner. For example, a vehicle might be driven off-road over rough terrain or become airborne, i.e., "jump" over a ramp of some sort, such as a hill. These misuse events present a challenge to engineering vehicle safety systems because the system needs to discriminate misuse events from crash events in order to properly control the actuation of protection devices, such as airbags. Further, some misuse events may be intentional, as drivers of some vehicles take their vehicles off-road for recreational purposes.

In fact, some vehicles are adapted for off-road use as a matter of utility or for recreational purposes. During off-road use, the vehicle can be prone to encountering abrupt movements, hard or abrupt starts/stops, steep angles, severe rocking in all directions, etc. Nevertheless, vehicle movements during certain off-road maneuvers for which safety device actuation is not desired could share a resemblance with crash events that do warrant safety device actuation.

Because of this, it can be appreciated that it is desirable to provide the ability to discriminate any vehicle condition that can be useful in determining whether or not safety device actuation/deployment is warranted. Even if the discriminated event is not sufficient in and of itself to make the actuate/non-actuate determination ("fire" or "no-fire"), it can be a piece of information that, along with other pieces of information, can be used to make the fire/no-fire determination.

Using this information, the actuation and timing of the actuatable restraints in the safety system in response to the type and/or severity of the crash event in which the vehicle is involved can be controlled. Using the information gleaned from the discrimination algorithms, the safety system can implement a crash evaluation process to discriminate between types of crash events in order to determine which, if any, occupant protection devices to actuate in response to a sensed crash event. If the identified crash event meets or exceeds a severity threshold, and the safing functions agree, the actuatable restraints can be actuated in a manner commensurate with the discriminated event type.

SUMMARY

According to a first aspect, a vehicle safety system includes an actuatable controlled restraint (ACR) comprising a seatbelt for restraining a vehicle occupant. The ACR is actuatable to control payout and retraction of the seatbelt. The system also includes a controller configured to determine operating conditions of the vehicle and to control the actuation of the ACR in response to the determined operating conditions of the vehicle. The ACR has a normal restraint condition and an enhanced restraint condition, the controller being configured to actuate the ACR from the normal restraint condition to the enhanced restraint condition in response to determining abnormal driving conditions of the vehicle.

According to a second aspect, the ACR in the normal restraint condition can be configured to apply a comparatively light retraction force sufficient to take up seatbelt webbing and tension the seatbelt across the occupant while, at the same time, be configured to payout the seatbelt webbing in response to occupant movement. In the enhanced restraint condition, the ACR increases the retraction force applied to the seatbelt webbing and to increase the resistance to seatbelt webbing payout in response to occupant movement.

According to a third aspect, alone or in combination with any of the preceding aspects, the abnormal driving conditions of the vehicle comprise at least one of a rough terrain vehicle condition and an airborne vehicle condition.

According to a fourth another aspect, alone or in combination with any of the preceding aspects, the controller can be an airbag controller (ACU) including:
- an ACU_X accelerometer for measuring vehicle accelerations along an X-axis of the vehicle and producing a signal indicative thereof;
- an ACU_Y accelerometer for measuring vehicle accelerations along a Y-axis of the vehicle and producing a signal indicative thereof;
- an ACU_Z accelerometer for measuring vehicle accelerations along a Z-axis of the vehicle and producing a signal indicative thereof; and
- a ROLL sensor for measuring vehicle roll accelerations about the X-axis of the vehicle and producing a signal indicative thereof;

The ACU can be configured to determine the abnormal driving conditions of the vehicle in response to the signals from the ACU_X, ACU_Y, ACU_Z, and ROLL sensors.

According to a fifth aspect, alone or in combination with any of the preceding aspects, the controller can be configured to implement a lateral acceleration rough terrain classification algorithm for classifying vehicle rough terrain conditions in response to vehicle lateral accelerations measured along a vehicle Y-axis. The controller can also be configured to implement a roll acceleration rough terrain classification algorithm for classifying vehicle rough terrain conditions in response to vehicle roll accelerations measured about a vehicle X-axis. The controller can further be configured to implement a vertical acceleration rough terrain classification algorithm for classifying vehicle rough terrain conditions in response to vehicle vertical accelerations measured along a vehicle Z-axis.

Additionally, according to the fifth aspect, the controller can be configured to determine a vehicle rough terrain condition in response to the lateral acceleration rough terrain classification algorithm, the roll acceleration rough terrain classification algorithm, and the vertical acceleration rough terrain classification algorithm classifying a vehicle rough terrain condition at the same time.

According to a sixth aspect, alone or in combination with any of the preceding aspects, the controller can be configured to implement a lateral acceleration rough terrain metric that evaluates vehicle lateral accelerations measured along the vehicle Y-axis over time. The lateral acceleration rough terrain metric classifies vehicle rough terrain conditions in response to the vehicle lateral accelerations measured along the vehicle Y-axis crossing a threshold in both positive and negative directions within a predetermined time period. The controller can also be configured to implement a roll acceleration rough terrain metric that evaluates vehicle roll accelerations measured about the vehicle X-axis over time. The roll acceleration rough terrain metric classifies vehicle rough terrain conditions in response to the vehicle roll accelerations measured along the vehicle X-axis crossing a threshold in both positive and negative directions within a predetermined time period. The controller can be further configured to implement a vertical acceleration rough terrain metric that evaluates vehicle vertical accelerations measured along the vehicle Z-axis over time. The vertical acceleration rough terrain metric classifies vehicle rough terrain conditions in response to the vehicle vertical accelerations measured along the vehicle Z-axis crossing a threshold in a positive direction.

Additionally, according to the sixth aspect, to determine the lateral acceleration rough terrain metric, the controller can be configured to evaluate a moving average of vehicle lateral accelerations measured along the vehicle Y-axis over time. To determine the roll acceleration rough terrain metric, the controller can be configured to evaluate a moving average of vehicle roll accelerations measured about the vehicle X-axis over time. To determine the vertical acceleration rough terrain metric, the controller can be configured to evaluate a moving average of vehicle vertical accelerations measured along the vehicle Z-axis over time.

According to a seventh aspect, alone or in combination with any of the preceding aspects, the controller can be configured to implement a longitudinal acceleration airborne classification algorithm for classifying vehicle airborne conditions in response to vehicle longitudinal accelerations measured along a vehicle X-axis. The controller can also be configured to implement a lateral acceleration airborne classification algorithm for classifying vehicle airborne conditions in response to vehicle lateral accelerations measured along a vehicle Y-axis. The controller can also be configured to implement a vertical acceleration airborne classification algorithm for classifying vehicle airborne conditions in response to vehicle vertical accelerations measured along a vehicle Z-axis. The controller can further be configured to implement a roll acceleration airborne classification algorithm for classifying vehicle airborne conditions in response to vehicle roll accelerations measured about a vehicle X-axis.

Additionally, according to the seventh aspect the controller can be configured to implement a vertical acceleration airborne confirmation algorithm for confirming the vehicle airborne condition in response to vehicle vertical accelerations measured along a vehicle Z-axis. Additionally, according to this aspect, the vertical acceleration airborne confirmation algorithm can be configured to determine a landed condition of the vehicle in response to vehicle vertical accelerations measured along a vehicle Z-axis. Additionally, according to this aspect, the controller can be configured to determine the vehicle airborne condition in response to classifying the vehicle airborne condition and confirming the vehicle airborne condition. The controller can be configured to determine the vehicle airborne condition further in response to determining that a vehicle off-road condition has not been determined. The controller can further be configured to implement an R_ANGLE off-road classification metric to the vehicle off-road condition, the R_ANGLE off-road classification metric evaluating a vehicle R_ANGLE over time and classifying a vehicle off-road condition in response to the R_ANGLE crossing both an upper threshold and a lower threshold within a predetermined amount of time in any order.

According to an eighth aspect, alone or in combination with any of the preceding aspects, the controller can be configured to implement a longitudinal acceleration airborne metric that evaluates vehicle longitudinal accelerations measured along the vehicle X-axis over time. The longitudinal acceleration airborne metric can define a threshold having a predetermined bandwidth that extends above and below a zero of the longitudinal acceleration airborne metric. The longitudinal acceleration airborne metric can be configured to classify a vehicle airborne condition in response to the magnitude of the metric value exceeding and falling back within the threshold. The longitudinal acceleration airborne metric can maintain the vehicle airborne condition classification while the metric value remains within the threshold.

According to the eighth aspect, the controller can also be configured to implement a lateral acceleration airborne metric that evaluates vehicle lateral accelerations measured along the vehicle Y-axis over time. The lateral acceleration airborne metric can define a threshold having a predetermined bandwidth that extends above and below a zero of the lateral acceleration airborne metric. The lateral acceleration airborne metric can be configured to classify a vehicle airborne condition in response to the magnitude of the metric value exceeding and falling back within the threshold. The lateral acceleration airborne metric can maintain the vehicle airborne condition classification while the metric value remains within the threshold.

According to the eighth aspect, the controller can also be configured to implement a roll acceleration airborne metric that evaluates vehicle roll accelerations measured about the vehicle X-axis over time. The roll acceleration airborne metric can define a threshold having a predetermined bandwidth that extends above and below a zero of the roll acceleration airborne metric. The roll acceleration airborne metric can be configured to classify a vehicle airborne condition in response to the magnitude of the metric value exceeding and falling back within the threshold. The roll acceleration airborne metric can maintain the vehicle airborne condition classification while the metric value remains within the threshold.

According to the eighth aspect, the controller can be further configured to implement a vertical acceleration airborne metric that evaluates vehicle vertical accelerations measured along the vehicle Z-axis over time. The vertical acceleration airborne metric can define a threshold having a predetermined bandwidth that extends above and below a zero of the vertical acceleration airborne metric. The vertical acceleration airborne metric can be calibrated to compensate for the effects of gravity. The vertical acceleration airborne metric can be configured to classify a vehicle airborne condition in response to the metric value crossing into the threshold. The vertical acceleration airborne metric can maintain the vehicle airborne condition classification while the metric value remains within the threshold.

Additionally, according to the eighth aspect, the controller can be configured to classify a vehicle airborne condition in response to determining that all of the following are true at the same time:
  the longitudinal acceleration airborne metric classifies vehicle airborne conditions;
  the lateral acceleration airborne metric classifies vehicle airborne conditions;
  the vertical acceleration airborne metric classifies vehicle airborne conditions; and
  the roll acceleration airborne metric classifies vehicle airborne conditions.

According to this aspect, the controller can be configured to maintain the vehicle airborne classification for a predetermined period of time. Additionally, according to this aspect, the controller can be configured to implement a vertical acceleration airborne confirmation metric that evaluates vehicle vertical accelerations measured along the vehicle Z-axis over time. The vertical acceleration airborne confirmation metric can define a threshold having a predetermined bandwidth selected so that the metric value passes through the bandwidth in response to landing after having been airborne, thus confirming the vehicle airborne condition. According to this aspect, in this manner, the controller can be configured to determine the vehicle airborne condition in response to classifying the vehicle airborne condition and confirming the vehicle airborne condition.

According to a ninth aspect, the controller can be an airbag controller unit (ACU) configured to control the actuation one or more airbags and the ACR.

DRAWINGS

The foregoing and other features and advantages of the invention will become apparent to one skilled in the art upon consideration of the following description of the invention and the accompanying drawings in which.

DESCRIPTION

The invention relates to a vehicle safety system that implements discrimination metrics, classification algorithms, and deployment algorithms for controlling an actuatable vehicle restraint. The metrics and algorithms implemented by the vehicle safety system can detect rough road conditions of the vehicle and airborne conditions of the vehicle. Advantageously, the vehicle safety system can respond to detecting these conditions by actuating one or more vehicle restraints.

In one particularly advantageous implementation, the vehicle safety system can control the actuation of an actuatable controlled restraint (ACR). An example ACR is a seatbelt retractor that includes a motor that can be used to actively control belt payout and retraction in response to a control signal. The ACR can also include other known features, such as pre-tensioners and/or load limiters. In this implementation, the vehicle safety system can actuate the ACR to tighten the seatbelt around the occupant in response to detecting the occurrence of a condition that might lead to a vehicle crash for which deployment of additional safety devices, such as airbags, might be warranted. If a crash event follows, the seatbelt will be pre-tightened against the occupant will therefore enhance the occupant protection afforded by the safety system. If the sensed condition does not lead to a crash event, the safety system can actuate the ACR to relieve or loosen the seatbelt, e.g., at a predetermined time after the onset of the initially detected condition.

Vehicle Safety System

Figure 1:
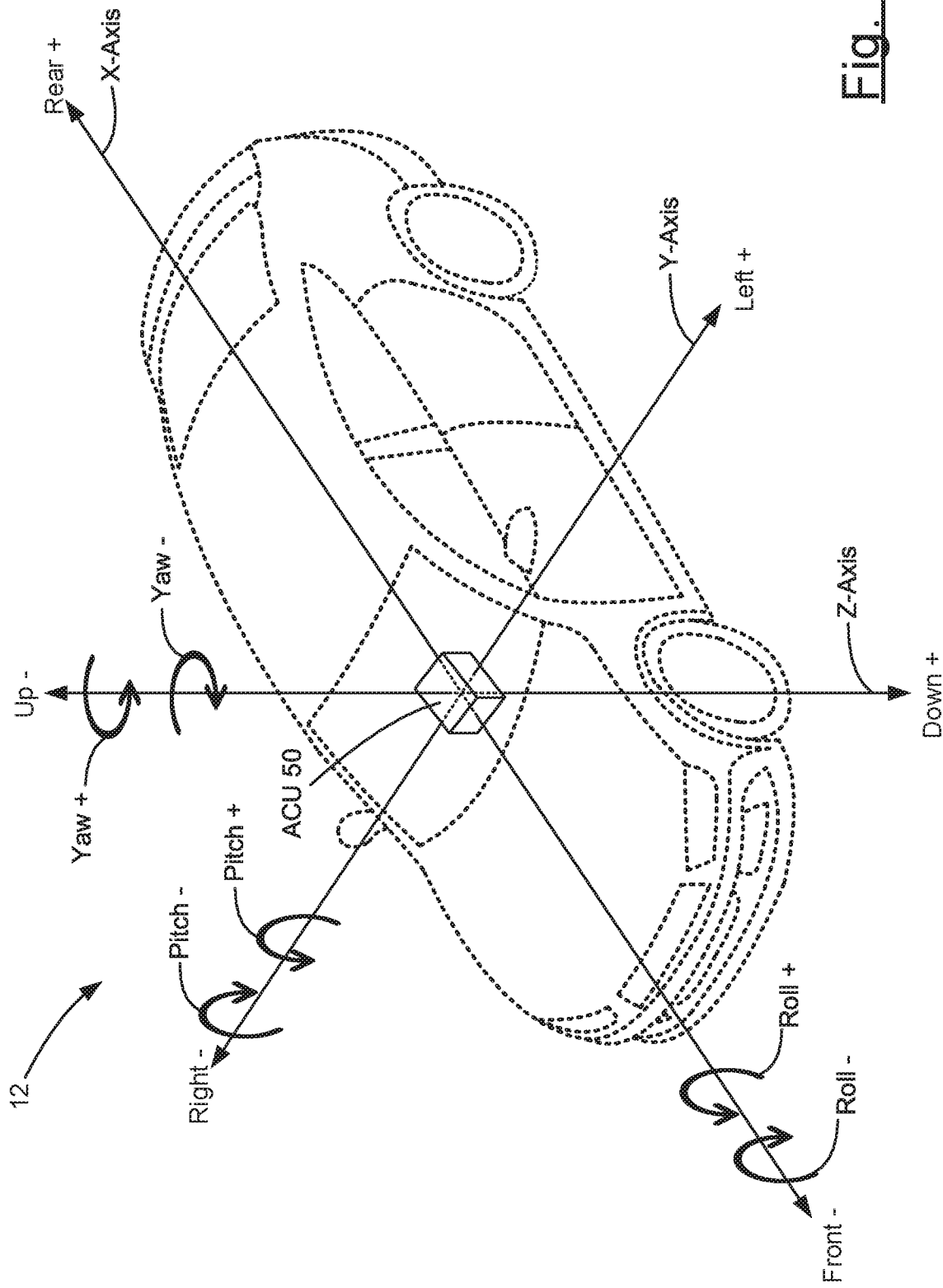
FIG. 1 is a schematic illustration of a vehicle and the signals obtained from the sensor architecture deployed therein.

Referring to FIG. 1, according to one example configuration, a vehicle 12 includes a vehicle safety system 10 that includes a central control unit, referred to herein as an airbag control unit (ACU) 50. The ACU 50 is operative to actuate one or more actuatable restraints in the vehicle 12, such as actuatable controlled restraints (ACRs), frontal airbags, curtain airbags, thorax airbags, side airbags, and knee airbags.

The ACU 50 includes one or more sensors that are operative to provide signals indicative of vehicle linear and/or angular accelerations and/or rates of movement in different directions and with respect to different vehicle axes. The sensors can be mounted locally in or on the ACU 50 itself or can be remote from the ACU and interconnected, e.g., via wire, to the ACU. These vehicle axes include an X-axis, which extends longitudinally in the vehicle in the direction of forward/rearward vehicle travel. A vehicle Y-axis extends laterally in the vehicle, perpendicular to the X-axis. A vehicle Z-axis extends vertically in the vehicle, perpendicular to both the X-axis and the Y-axis.

The X, Y, and Z axes are shown in FIG. 1 as intersecting at the ACU 50. This is because the ACU 50 can include sensors for measuring movement, i.e., acceleration, of the vehicle 12 with respect to the X, Y, and Z axes. These movements are identified in FIG. 1 with signage (+/−) indicating the sign, positive or negative, that the safety system 10 assigns the motion along the axes. The ACU 50 can also include sensors for sensing rotation about the X-axis, i.e., pitch, about the Y-axis, i.e., roll, and about the Z-axis, i.e., yaw. The vehicle safety system 10 can utilize these accelerations and/or rotations in different combinations to detect certain vehicle conditions.

As shown in FIG. 1, the vehicle safety system 10 can be configured to interpret motions along the X-axis as positive front-to-rear (acceleration) and negative rear-to-front (deceleration). Motions along the Y-axis can be interpreted as positive right-to-left and negative left-to-right. Motions along the Z-axis can be interpreted as positive in the downward direction and negative in the upward direction. The vehicle safety system 10 can also be configured to interpret vehicle rotational motions about the X-axis, i.e., roll, can be positive for left roll and negative for right roll. Vehicle rotational motions about the Y-axis, i.e., pitch, can be positive for forward/downward pitch and negative for rearward/upward pitch. Vehicle rotational motions about the Z-axis, i.e., yaw, can be positive for left yaw (as viewed from the forward-facing perspective) and negative for right yaw.

Actuatable Controlled Restraint (ACR)

Figure 2:
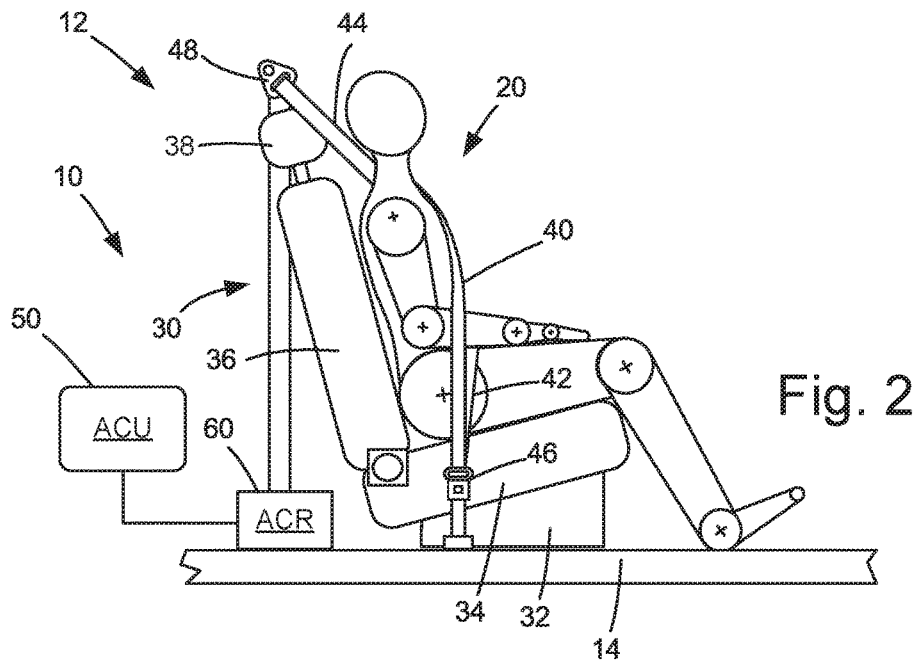
FIG. 2 is a schematic diagram illustrating a seated vehicle occupant utilizing a vehicle safety system including an actuatable controlled restraint (ACR).

FIG. 2 illustrates portions of the vehicle 12 and the vehicle safety system 10. As shown in FIG. 2, an occupant 20 of the vehicle 12 is positioned on a vehicle seat 30. The seat 30 includes a seat base 32 for mounting the seat on a floor 14 of the vehicle 12. The base supports a bottom cushion 34 upon which the occupant 20 sits, a seat back 36 against which the occupant leans back against, and a head rest 38 for receiving the occupant's head.

As shown in FIG. 2, the safety system 10 includes a seatbelt 40, the ACU 50, and an actuatable controlled restraint (ACR) 60 associated with the seatbelt. In the example configuration shown in FIG. 2, the seatbelt 40 is a conventional three-point seatbelt that includes a lap belt portion 42 that is extensible across the occupant's lap, a shoulder belt portion 44 that is extensible over the occupant's shoulder and across the torso. A buckle 46 secures the seatbelt 40 in the fastened condition shown in FIG. 2. A D-ring 48 guides the seatbelt 40 to the ACR 60.

The ACR 60 serves the purpose of a conventional seatbelt retractor. The ACR pays out seatbelt webbing to permit the occupant 20 to extend the shoulder portion 44 and lap portion 42 across his or her body and engage the buckle 46 in the buckled and restrained condition shown in FIG. 2. The ACR also retracts the seatbelt webbing when the occupant 20 unbuckles the seatbelt 40, placing himself or herself in an unrestrained condition. Additionally, the ACR 60 can be configured to include components allowing it to function as a pretensioner for retracting the seatbelt in response to a vehicle crash. The ACR 60 can further be configured to include components allowing it to function as a load limiter for paying out seatbelt webbing in the event of a vehicle crash where loads on the seatbelt 40 meet or exceed a predetermined magnitude.

The ACR 60 also includes a motor that is configured to actively control payout and retraction of the seatbelt webbing. The ACR 60 is operatively connected to the ACU 50, which is operable to control the ACR to actively payout and retract the seatbelt webbing. As described herein, the ACU 50 is configured to control the operation of the ACR 60 in response to vehicle conditions determined through the evaluation of data received from vehicle sensors.

When normal driving conditions are sensed, the ACU 50 is configured to place the seatbelt 40 in a normal restraint condition, pulled against the occupant 20 with a light amount of force sufficient just to remove slack from the belt and maintain the belt against the occupant's body, as shown in FIG. 2. In the normal restraint condition, the ACR 60 acts as an ordinary seatbelt retractor, taking up the seatbelt webbing with a light amount of force that can be easily payed out, for example, if the occupant leans forward. If a crash occurs, the ACU 50 is configured to sense the event and actuate the ACR to provide any desired pre-tensioning in response to the crash event in a conventional manner. Conventional load limiting performance can also take place here, although it is typically passive in nature, provided mechanically through a structure, such as a torsion bar/torsion spring.

Advantageously, when driving conditions considered not normal, such as certain misuse events, are determined, the ACU 50 is configured to respond by actuating the ACR 60 to place the seatbelt 40 in an enhanced restraint condition. In the enhanced restraint condition, the ACR 60 tensions the seatbelt 40 around the occupant 20 in order to enhance the degree to which the occupant is restrained in the vehicle seat 30. Once driving conditions are determined to be normal, the ACU 50 can control the ACR 60 to place the seatbelt 40 in the normal restraint condition.

According to one example implementation of the safety system 10, the ACU 50 is configured to determine a rough road condition and/or an airborne vehicle condition that does not necessarily rise to the level where deployment of actuatable restraints, such as airbags, is warranted. These events are considered to be dangerous misuse events that could lead to a vehicle crash that warrants airbag deployment. It is, however, also possible that these dangerous misuse events might not actually lead to a vehicle crash event that warrants airbag deployment. This can be the case, for example, where the vehicle operator is operating the vehicle off-road for recreational purposes. This can also be the case, for example, where the vehicle operator loses control of the vehicle, exits (e.g., skids or slides) off the roadway, and encounters rough terrain and/or goes airborne.

Accordingly, in response to determining a rough road/airborne condition, the ACU 50 is configured to control the ACR 60 to place the seatbelt 40 in the enhanced restraint condition in order to enhance the degree to which the occupant is restrained in the vehicle. This is done as a precautionary measure in case a crash event follows. If a crash event ensues, the ACU 50 is configured to determine the crash event and actuate other protection devices, such as airbags, according to known crash discrimination algorithms. If a crash event does not ensue, e.g., within a predetermined time period after the rough road/airborne condition is determined, the ACU 50 is configured to actuate the ACR 60 to relieve the tension on the seatbelt 40, placing it back in the normal restraint condition.

Figure 3:
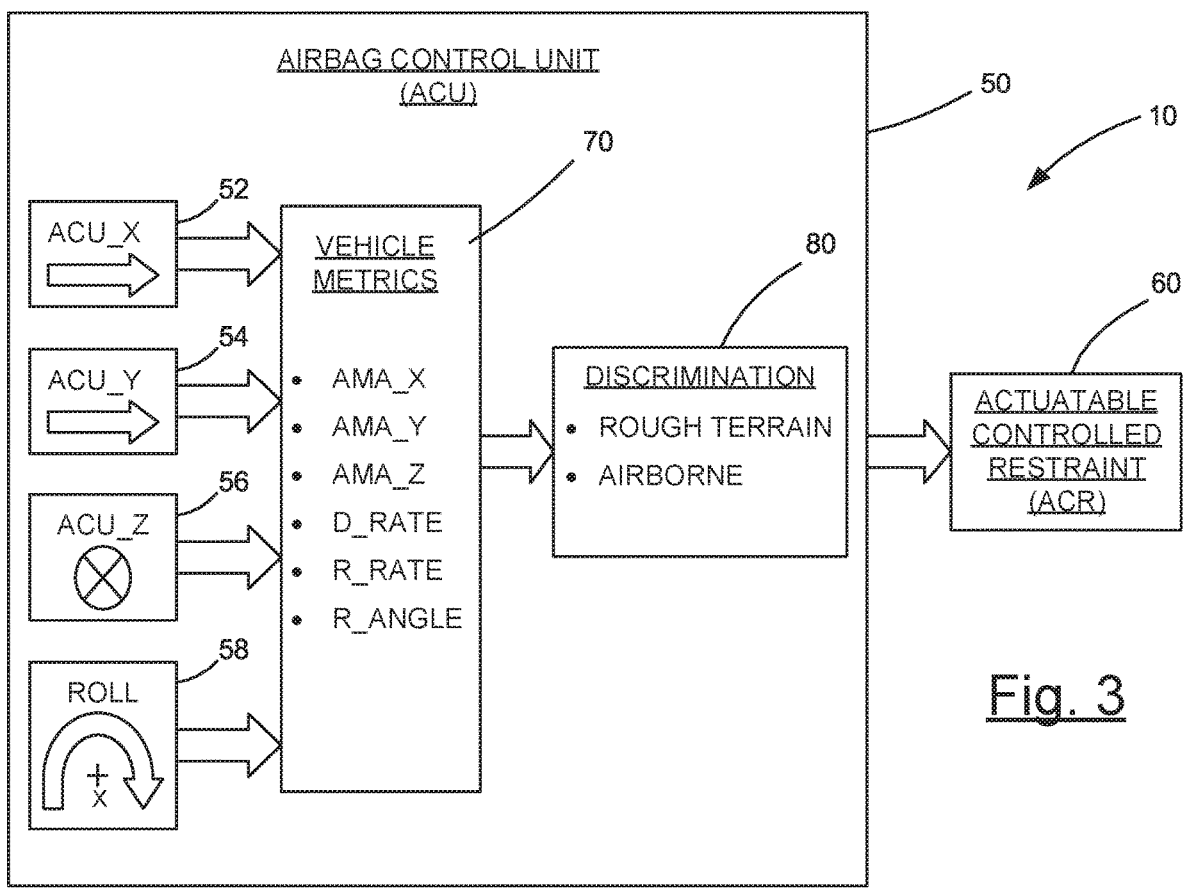
FIG. 3 is a block diagram illustrating the vehicle safety system.

Portions of the vehicle safety system 10 are illustrated schematically in FIG. 3. Referring to FIG. 3, The ACU 50 includes internal sensors in the form of accelerometers for sensing some of the vehicle parameters identified in FIG. 1. The ACU 50 utilizes an accelerometer 52 for sensing vehicle longitudinal (X-axis) acceleration (ACU_X), an accelerometer 54 for sensing vehicle lateral (Y-axis) acceleration (ACU_Y), an accelerometer 56 for sensing vehicle vertical (Z-axis) acceleration (ACU_Z), and a roll rate sensor 58 for sensing vehicle roll rate values (ROLL), i.e., roll rate about the vehicle X-axis. While the vehicle safety system 10 can also include additional accelerometers and/or sensors, such as satellite sensors, pitch sensors, and yaw sensors, those values are not implemented in the algorithms disclosed herein and therefore are not shown in FIG. 3.

It can be desirable to position the sensors on or near the respective axes along or about which they sense vehicle motion. Since the sensors can be mounted locally on the ACU 50, it can be desirable to mount the ACU at or near the vehicle center of mass, through which the vehicle X, Y, and Z axes pass. The position of the ACU 50 at or near the vehicle center of mass, however, is not critical, and the ACU 50 could be positioned elsewhere in the vehicle.

Hardware and software configurations for ACUs implemented in vehicle safety systems are known in the art. Therefore, a detailed description of the hardware configuration of the ACU 50 is not necessary for one having ordinary skill in the art to understand and appreciate the vehicle safety system 10. The ACU 50 of FIG. 1 includes a central processing unit (CPU), such as a microcomputer, that is configured to receive the signals ACU_X, ACU_Y, ACU_Z, ROLL from their respective sensors, to perform vehicle metric calculations 70 on those signals, and to perform rough terrain and airborne discrimination algorithms 80 utilizing the calculated metrics.

The vehicle metrics resulting from the calculations 70 include:
Vehicle longitudinal X-axis acceleration moving average (AMA_X).
Vehicle lateral Y-axis acceleration moving average (AMA_Y).
Vehicle vertical Z-axis acceleration moving average (AMA_Z).
Vehicle roll difference rate, i.e., roll acceleration, (D_RATE).
Vehicle roll angle (ANGLE).
Vehicle roll rate (RATE).

The rough terrain and airborne discrimination algorithms 80 are just two events that the vehicle safety system 10 is configured to detect. These two conditions are the only ones illustrated herein because their determination is the subject of this description. The safety system 10 can, of course, be configured to determine many other conditions, including vehicle collision and rollover conditions. Which events the vehicle safety system 10 is configured to detect can vary depending on a variety of factors such as manufacturer requirements and/or the government and industry standards under which the vehicle is produced.

Figure 4:
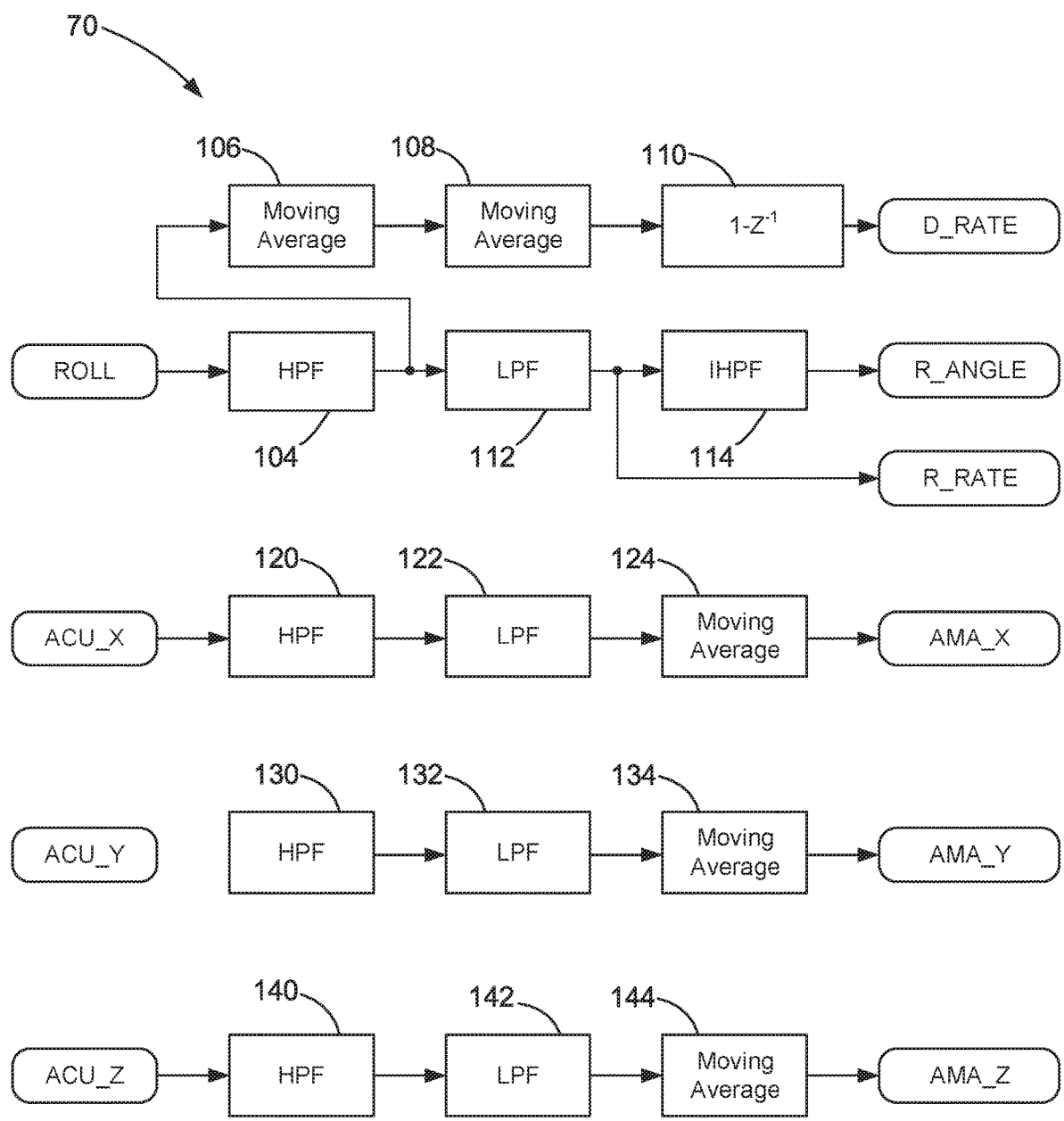
FIG. 4 is a block diagram illustrating metric calculations implemented in the vehicle safety system.

FIG. 4 illustrates the vehicle metric calculations 70 performed by the ACU 50. The elements of the vehicle metric calculations 70 shown in FIG. 4, referred to herein as "functions" performed internally by the ACU 50.

Roll Rate

The ACU 50 employs internal signal conditioning that includes analog to digital conversion (ADC) for digitizing the ROLL, ACU_X, ACU_Y and ACU_Z signals. The accelerometers 52, 54, 56 and the roll sensor 58 can perform the digitization of the ROLL, ACU_X, ACU_Y and ACU_Z signals. The ACU 50 can also employ rail checking and bias adjustments of the ROLL, ACU_X, ACU_Y and ACU_Z signals.

As shown in FIG. 4, the digitized and biased roll rate ROLL is passed to a high-pass filter (HPF) function 104 that, for example, can be selected to have a time constant which results in resetting the filter function after a predetermined time period, e.g., T=8 seconds. The high-pass filtered roll rate ROLL produced at HPF function 104 is passed to moving average function 106 and then to moving average function 108. Each moving average function 106, 108 can, for example, be tunable to select the number of samples, e.g., 1-32 samples in the moving average. The moving average functions 106, 108 smooth the variations in the roll rate.

The high-pass filtered roll rate ROLL produced at HPF function 104 is passed to low-pass filter (LPF) function 112 that produces the roll rate metric R_RATE, which has a value indicative of vehicle roll rate (i.e., angular velocity), that is implemented in the rough terrain and airborne discrimination algorithms 80 (see, FIG. 3). R_RATE is passed to integrating high-pass filter (IHPF) function 114, which includes an integrator function and a dual time constant high-pass filter function. The IHPF function 114 integrates the R_RATE signal to produce a value indicative of a determined relative roll angle of the vehicle. The IHPF function 114 also performs high-pass filtering of the R_RATE signal. The IHPF function 114 produces the metric R_ANGLE, which is implemented in the rough terrain and airborne discrimination algorithms 80 (see, FIG. 3).

R_ANGLE is indicative of a normalized roll angle of the vehicle, which is a measure of relative angular rotation of the vehicle in response to a sensed roll rate. IHPF function 114 can reset the R_ANGLE based on a time constant for the high-pass filter function so that R_ANGLE provides an indication of angular rotation during the occurrence of a detected roll rate. R_ANGLE therefore may not indicate the actual angular orientation of the vehicle relative to the ground. In this way, the determination of a vehicle rollover condition need not depend on a determination of an initial angular orientation of the vehicle relative to the ground or road.

The roll rate moving average function 108 is provided to difference function 110 where the difference between the current sample and the previous sample are compared. This produces differenced roll rate metric D_RATE, which is indicative of a rate of change, i.e., acceleration, of the roll rate. This roll acceleration D_RATE is the angular acceleration of the vehicle about the vehicle X-axis. The roll acceleration D_RATE is implemented in the rough road and airborne discrimination algorithms 80 (see, FIG. 3).

Longitudinal Acceleration

As shown in FIG. 4, the digitized and biased longitudinal acceleration ACU_X is passed to high-pass filter (HPF) function 120 that, for example, can be selected to have a time constant which results in resetting the filter function after a predetermined time period, e.g., T=8 seconds. The high-pass filtered longitudinal acceleration ACU_X produced at HPF function 120 is passed to low-pass filter (LPF) function 122. The low-pass filtered longitudinal acceleration ACU_X value produced at LPF function 122 is passed to moving average block 124, which produces the longitudinal acceleration metric AMA_X. The number of samples included in the moving average function 124 can be tuned within a predetermined range, such as 1-32 samples. AMA_X is a longitudinal acceleration moving average value that is implemented in the rough road and airborne discrimination algorithms 80 (see, FIG. 3).

Lateral Acceleration

As shown in FIG. 4, the digitized and biased lateral acceleration ACU_Y is passed to high-pass filter (HPF) function 130 that, for example, can be selected to have a time constant which results in resetting the filter function after a predetermined time period, e.g., T=8 seconds. The high-pass filtered lateral acceleration ACU_Y produced at HPF function 130 is passed to low-pass filter (LPF) function 132. The low-pass filtered lateral acceleration ACU_Y value produced at LPF function 132 is passed to moving average block 134, which produces the lateral acceleration metric AMA_Y. The number of samples included in the moving average function 134 can be tuned within a predetermined range, such as 1-32 samples. AMA_Y is a lateral acceleration moving average value that is implemented in the rough road and airborne discrimination algorithms 80 (see, FIG. 3).

Vertical Acceleration

As shown in FIG. 4, the digitized and biased vertical acceleration ACU_Z is passed to high-pass filter (HPF) function 140 that, for example, can be selected to have a time constant which results in resetting the filter function after a predetermined time period, e.g., T=8 seconds. The high-pass filtered vertical acceleration ACU_Z produced at HPF function 140 is passed to low-pass filter (LPF) function 142. The low-pass filtered vertical acceleration ACU_Z value produced at LPF function 142 is passed to moving average block 144, which produces the vertical acceleration metric AMA_Z. The number of samples included in the moving average function 144 can be tuned within a predetermined range, such as 1-32 samples. AMA_Z is a vertical acceleration moving average value that is implemented in the rough road and airborne discrimination algorithms 80 (see, FIG. 3).

Rough Terrain Discrimination Algorithms

Figure 5:
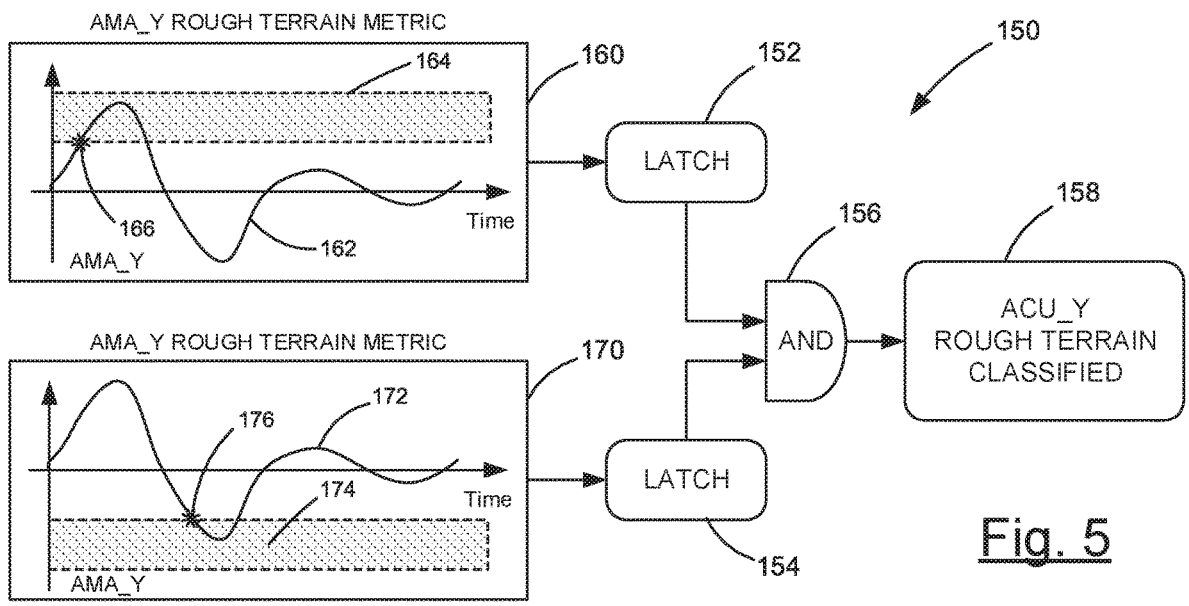
FIGS. 5-7 are diagrams illustrating discrimination metrics and algorithms, implemented in the vehicle safety system, for classifying a rough terrain event.
Figure 6:
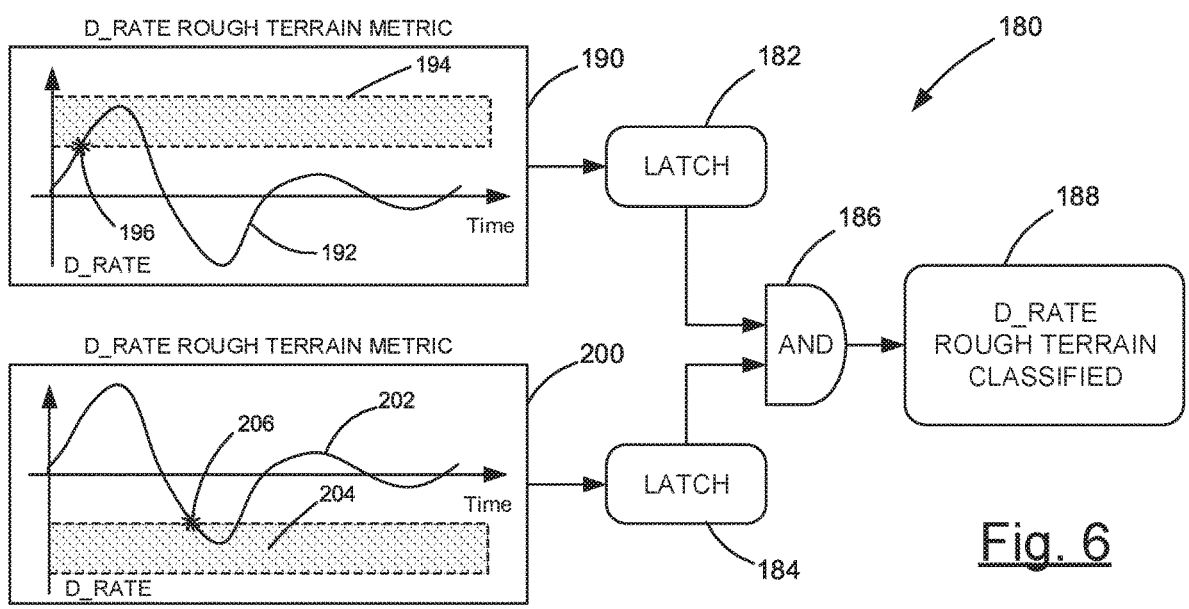
Figure 7:
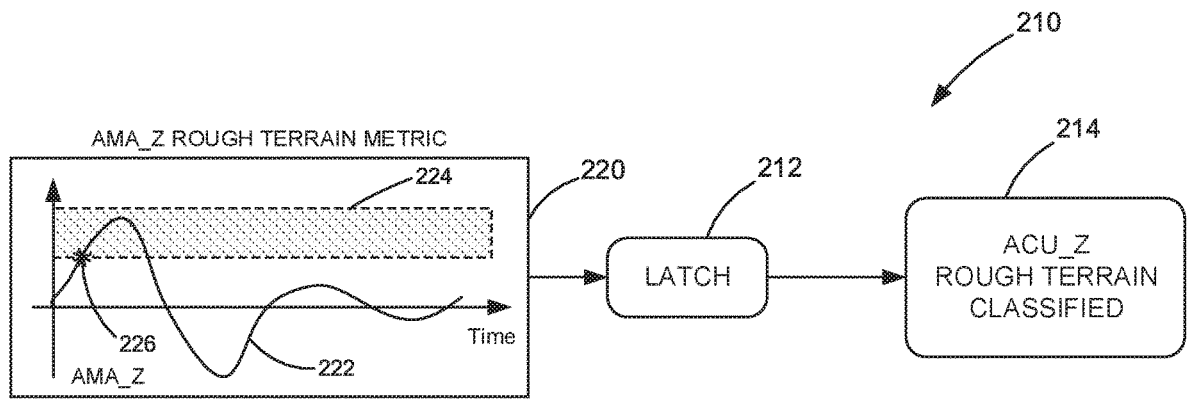

FIGS. 5-8 illustrate rough terrain discrimination algorithms implemented by the vehicle safety system 10. The algorithms of FIGS. 5-7 implement metrics and Boolean logic to classify a rough terrain condition based on the signals obtained from the ACU_Y, ACU_Z, and ROLL sensors. In this description, the metrics and logic functions are described as being ON/OFF or triggered ON/OFF. The ON condition is associated with a Boolean One in the Boolean logic of the illustrated algorithms, and the OFF condition is associated with a Boolean Zero in the Boolean logic of the illustrated algorithms. The conditions classified by the algorithms of FIGS. 5-7 are used in the discrimination algorithm of FIG. 8 to determine the rough terrain condition and actuate the ACR 60 to place the seatbelt 40 in the enhanced restraint condition.

ACU-Y Rough Terrain Classification Algorithm

The ACU 50 implements an algorithm for classifying a vehicle rough terrain condition in response to vehicle lateral accelerations along the Y-axis. Referring to FIG. 5, a lateral acceleration rough terrain classification algorithm 150 is implemented by the ACU 50. The algorithm 150 utilizes the ACU_Y accelerometer 54 internal to the ACU 50 to classify a rough terrain condition of the vehicle 12. To do so, the algorithm 150 implements AMA_Y rough terrain metrics 160, 170 which are illustrated graphically in FIG. 5.

The AMA_Y rough terrain metric 160 evaluates AMA_Y over time to determine a metric value 162. If the metric value 162 crosses a threshold 164, as indicated at 166, the AMA_Y rough terrain metric 160 is triggered ON and outputs a Boolean one to latch block 152. In response, latch block 152 is triggered ON, outputs a Boolean one, and that output is maintained, i.e., latched, for a predetermined amount of time, which is a tunable parameter of the algorithm 150. The threshold 164 evaluates positive values of AMA_Y and therefore evaluates positive, i.e., vehicle left, accelerations along the vehicle Y-Axis (see FIG. 1).

Similarly, the AMA_Y rough terrain metric 170 evaluates AMA_Y over time to determine a metric value 172. If the metric value 172 crosses a threshold 174, as indicated at 176, the AMA_Y rough terrain metric 170 is triggered ON and outputs a Boolean one to latch block 154. In response, latch block 154 is triggered ON and outputs a Boolean one, that output is maintained, i.e., latched, for a predetermined amount of time, which is a tunable parameter of the algorithm 150. The threshold 174 evaluates negative values of AMA_Y and therefore evaluates negative, i.e., vehicle right, accelerations along the vehicle Y-Axis (see FIG. 1).

The outputs of latch blocks 152, 154 are provided to AND block 156. If both latch blocks 152, 154 output a Boolean one, AND block 156 is triggered ON and outputs a Boolean one, and an ACU_Y rough terrain classified condition is determined at block 158. Because the outputs of the metrics 160, 170 are latched at blocks 152, 154 for a predetermined time, it can be seen that the ACU_Y rough terrain classification algorithm 150 classifies the ACU_Y rough terrain classification 158 when the vehicle 12 is undergoing lateral accelerations in opposite directions of sufficient magnitude and within a predetermined time period consistent with the vehicle travelling over rough terrain.

ROLL Rough Terrain Classification Algorithm

The ACU 50 implements an algorithm for classifying a vehicle rough terrain condition in response to roll accelerations about the vehicle X-Axis. Referring to FIG. 6, a roll acceleration rough terrain classification algorithm 180 is implemented by the ACU 50. The algorithm 180 utilizes the ROLL sensor 58 internal to the ACU 50 to classify a rough terrain condition of the vehicle 12. To do so, the algorithm 180 implements D_RATE rough terrain metrics 190, 200 which are illustrated graphically in FIG. 6.

The D_RATE rough terrain metric 190 evaluates D_RATE over time to determine a metric value 192. If the metric value 192 crosses a threshold 194, as indicated at 196, the D_RATE rough terrain metric 190 is triggered ON and outputs a Boolean one to latch block 182. In response, latch block 182 is triggered ON, outputs a Boolean one, and that output is maintained, i.e., latched, for a predetermined amount of time, which is a tunable parameter of the algorithm 180. The threshold 194 evaluates positive values of D_RATE and therefore evaluates positive, i.e., right roll about the vehicle X-Axis (see FIG. 1).

Similarly, the D_RATE rough terrain metric 200 evaluates D_RATE over time to determine a metric value 202. If the metric value 202 crosses a threshold 204, as indicated at 206, the D_RATE rough terrain metric 200 is triggered ON and outputs a Boolean one to latch block 184. In response, latch block 184 is triggered ON, outputs a Boolean one, and that output is maintained, i.e., latched, for a predetermined amount of time, which is a tunable parameter of the algorithm 180. The threshold 204 evaluates negative values of D_RATE and therefore evaluates negative, i.e., left roll about the vehicle X-Axis (see FIG. 1).

The outputs of latch blocks 182, 184 are provided to AND block 186. If both latch blocks 182, 184 output a Boolean one, AND block 186 is triggered ON, outputs a Boolean one, and a ROLL rough terrain classified condition is determined at block 188. Because the outputs of the metrics 190, 200 are latched at blocks 182, 184 for a predetermined time, it can be seen that the ROLL rough terrain classification algorithm 180 classifies the ROLL rough terrain classification 188 when the vehicle 12 is undergoing roll accelerations (D_RATE) in opposite directions of sufficient magnitude and within a predetermined time period consistent with the vehicle travelling over rough terrain.

ACU-Z Rough Terrain Classification Algorithm

The ACU 50 implements an algorithm for classifying a vehicle rough terrain condition in response to vertical vehicle accelerations along the Z-axis. Referring to FIG. 7, a vertical rough terrain classification algorithm 210 is implemented by the ACU 50. The algorithm 210 utilizes the ACU_Z accelerometer 54 internal to the ACU 50 to classify a rough terrain condition of the vehicle 12. To do so, the algorithm 210 implements AMA_Z rough terrain metrics 220 which is illustrated graphically in FIG. 7.

The AMA_Z rough terrain metric 220 evaluates AMA_Z over time to determine a metric value 222. If the metric value 222 crosses a threshold 224, as indicated at 226, the AMA_Z rough terrain metric 220 is triggered ON and outputs a Boolean one to latch block 212. In response, latch block 212 is triggered ON, outputs a Boolean one, and that output is maintained, i.e., latched, for a predetermined amount of time, which is a tunable parameter of the algorithm 210. The threshold 224 evaluates positive values of AMA_Z and therefore evaluates positive, i.e., vehicle downward, accelerations along the vehicle Z-Axis (see FIG. 1).

Latch block 212 being triggered ON and outputting a Boolean one produces an ACU_Z rough terrain classified condition determination at block 214. Because the outputs of the metric 220 is latched at block 212 for a predetermined time, it can be seen that the ACU_Z rough terrain classification algorithm 210 classifies the ACU_Z rough terrain classification 218 when the vehicle 12 undergoes a downward acceleration of a magnitude consistent with the vehicle travelling over rough terrain.

Rough Terrain Determination

Figure 8:
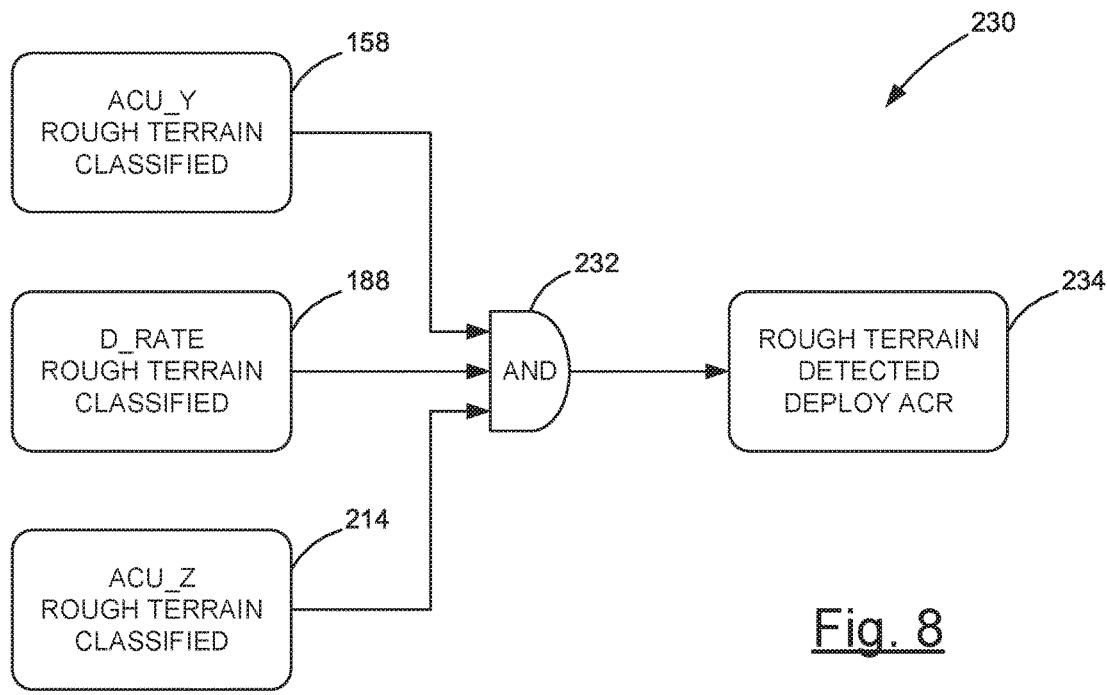
FIG. 8 is a diagram illustrating a rough terrain deployment algorithm implemented in the vehicle safety system.

Referring to FIG. 8, a rough terrain determination algorithm 230 is implemented by the ACU 50. The algorithm 230 utilizes the ACU_Y rough terrain classification algorithm 150, the ROLL rough terrain classification algorithm 180, and the ACU_Z rough terrain classification algorithm 210 to determine whether the vehicle 12 is travelling over rough terrain. As shown in FIG. 8, the ACU_Y rough terrain classification 158 (FIG. 5), the D_RATE rough terrain classification 188 (FIG. 6), and the ACU_Z rough terrain classification 214 (FIG. 7) are inputted to AND block 232. If all three conditions are met, AND block 232 is triggered ON, outputs a Boolean one, and the rough terrain determination algorithm 230 determines rough terrain and issues a deploy ACR command, as shown at block 234.

From the above, it will be appreciated that the ACU 50, implementing the algorithms 150, 180, 210, and 230, determines a rough terrain condition of the vehicle 12 and deploys the ACR when all of the following occur within a predetermined time period:

The vehicle 12 is undergoing lateral accelerations (AMA_Y) along a vehicle Y-Axis in opposite directions with magnitudes consistent with travel over rough terrain.

The vehicle 12 is undergoing roll accelerations (D_RATE) about a vehicle X-Axis in opposite directions with magnitudes consistent with travel over rough terrain.

The vehicle 12 is undergoing vertical accelerations (AMA_Z) along a vehicle Z-Axis in a downward direction with a magnitude consistent with travel over rough terrain.

Deployment of the ACR 60 in response to the rough terrain determination 234 results in the seatbelt 40 being placed in the enhanced restraint condition. Once driving conditions are determined to be normal, the ACU 50 can control the ACR 60 to place the seatbelt 40 in the normal restraint condition. The transition from enhanced to normal restraint can, for example, take place in response to AND block 232 being triggered OFF and outputting a Boolean zero indicating the loss of one or more of the rough terrain classifications 158, 188, 214. As another example, the rough terrain determination 234 can be latched, so the transition from enhanced to normal restraint takes place in response to AND block 232 being triggered OFF, outputting a Boolean zero, and the timing out of the latch timer.

Airborne Discrimination Algorithms

Figure 9:
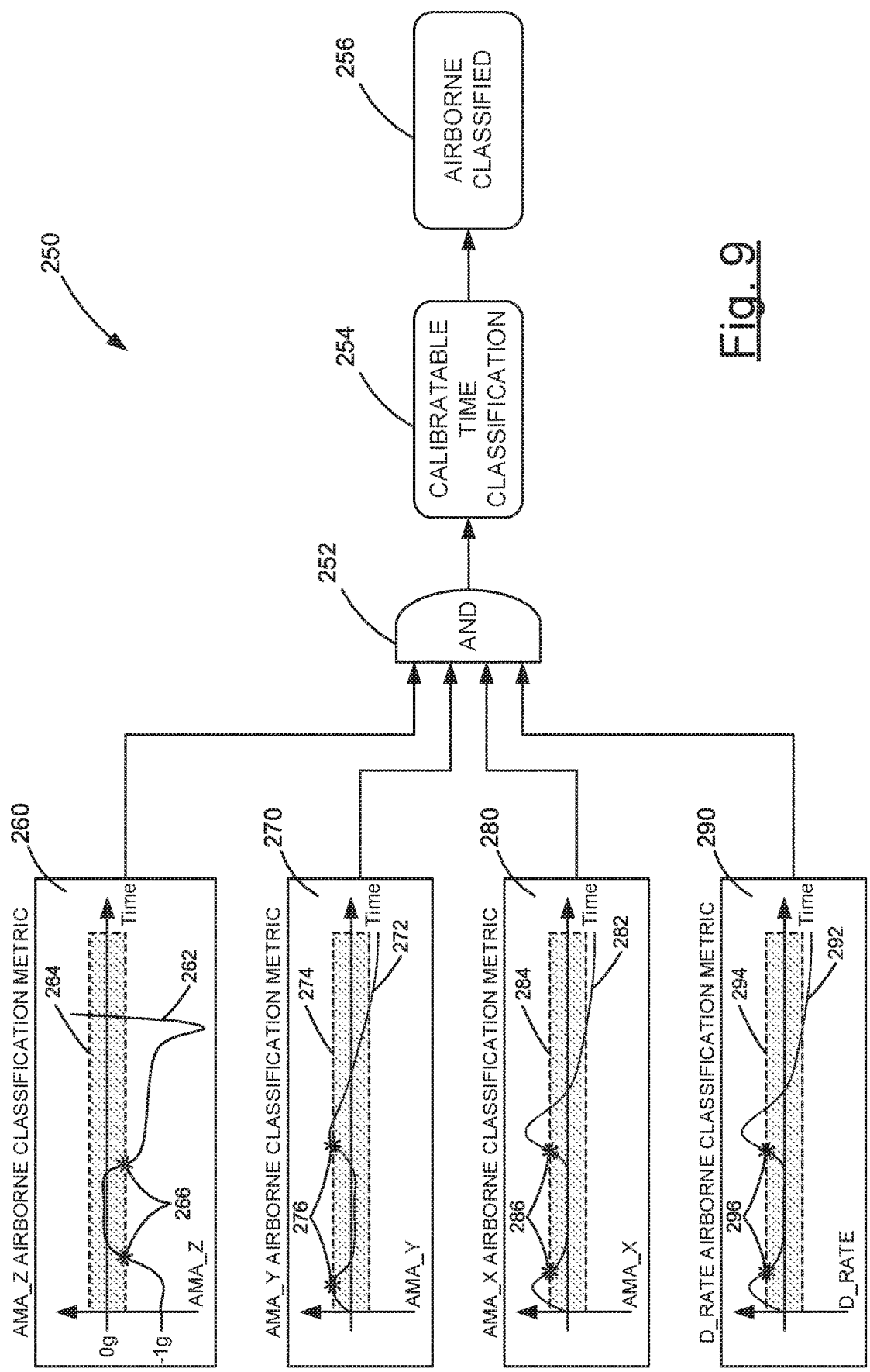
FIG. 9 is a diagram illustrating discrimination metrics and algorithms, implemented in the vehicle safety system, for classifying an airborne event.
Figure 10:
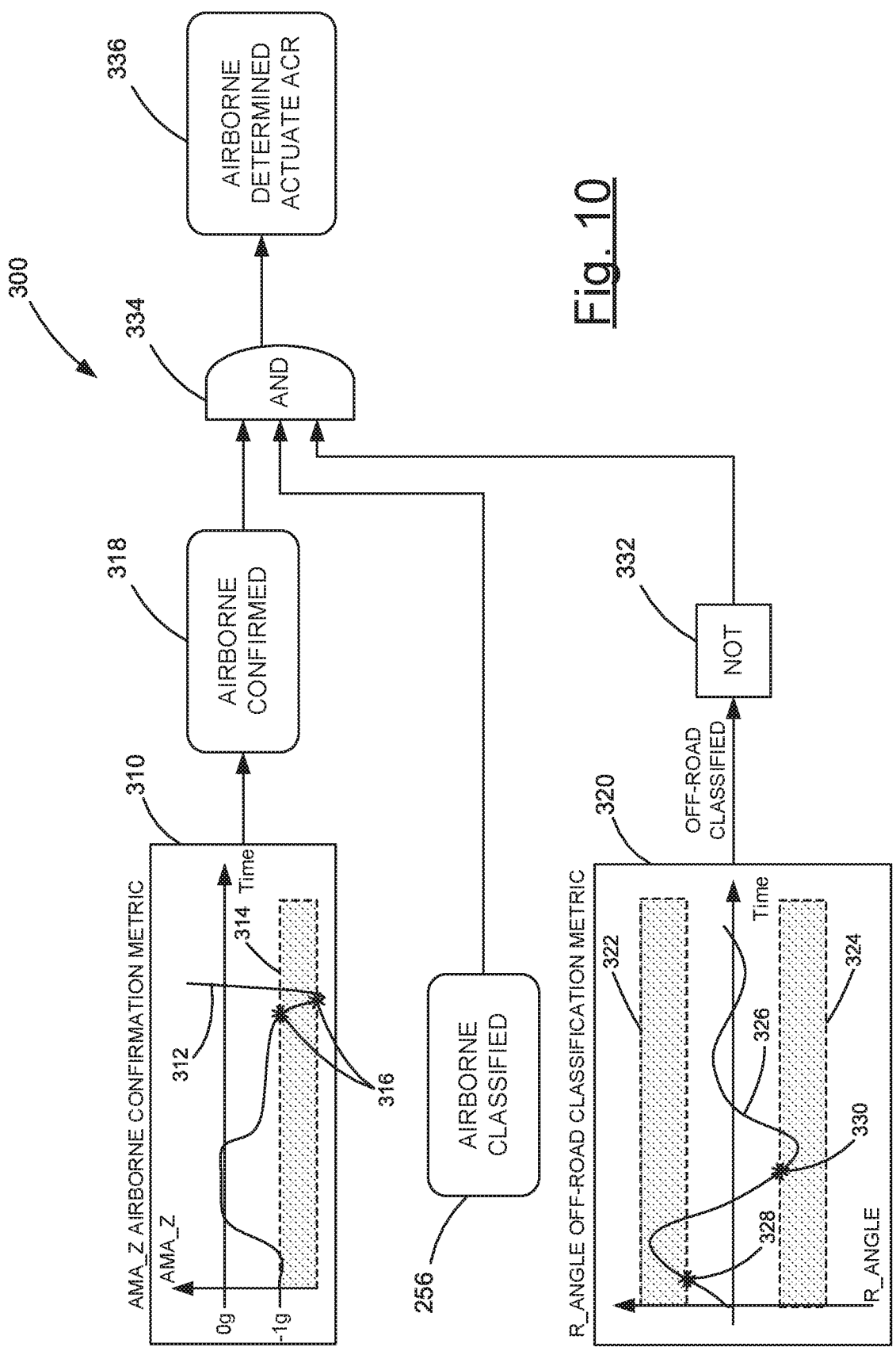
FIG. 10 is a logic diagram illustrating an airborne deployment algorithm implemented in the vehicle safety system.

FIGS. 9-10 illustrate airborne discrimination algorithms implemented by the vehicle safety system 10. The algorithm of FIG. 9 implement metrics and Boolean logic to classify an airborne condition based on the signals obtained from the ACU_X, ACU_Y, ACU_Z, and ROLL sensors. The algorithm of FIG. 10 implements a metric and Boolean logic to confirm the airborne classification determined according to the algorithm of FIG. 9 and, in response, to actuate the ACR 60 to place the seatbelt 40 in the enhanced restraint condition.

ACU Airborne Classification Algorithm

Referring to FIG. 9, an ACU airborne classification algorithm 250 is implemented by the ACU 50. The algorithm 250 utilizes the accelerometers internal to the ACU 50, namely ACU_X 52, ACU_Y 54, ACU_Z 56, and Roll 58 (see FIG. 2), to classify an airborne condition of the vehicle 12. To do so, the algorithm 250 implements an AMA_Z airborne classification metric 260, an AMA_Y airborne classification metric 270, an AMA_X airborne classification metric 280, and a ROLL airborne classification metric 290. The metrics 260, 270, 280, 290 are illustrated graphically in FIG. 9.

AMA-Z Airborne Classification Metric

The AMA_Z airborne classification metric 260 evaluates AMA_Z over time to determine a metric value 262. The AMA_Z airborne classification metric 260 adds the effects of gravity (−1 g) from the measured acceleration so that the metric value 262 is zero when the vehicle is airborne. During normal driving on a smooth surface, the AMA_Z airborne classification metric 260 will therefore hover at or about −1 g. When the vehicle 12 launches to go airborne, it undergoes a steep rise in AMA_Z, as shown at the left of the metric value 262. Once airborne, the metric value 262 plateaus at or about 0 g. When the vehicle 12 descends, AMA_Z falls, as does the metric value 262 shown to the right of the plateau. When the vehicle 12 lands, a sharp spike in the metric value 262 below −1 g is shown, followed by an immediate bounce upward.

If the metric value 262 crosses a threshold 264, as indicated at 266, the AMA_Z airborne classification metric 260 is triggered ON and outputs a Boolean one to AND block 252. Once triggered ON, the Boolean one output of the AMA_Z airborne classification metric 260 is maintained until the metric value 262 falls below the threshold 264. The AMA_Z airborne classification metric 260 evaluates AMA_Z, subtracting out the effects of gravity, and determines a vehicle airborne condition when vehicle acceleration along the vehicle Z-Axis is zero. By tuning the bandwidth of the threshold 264, the AMA_Z airborne classification metric 260 can accurately classify a vehicle airborne condition.

AMA-Y Airborne Classification Metric

The AMA_Y airborne classification metric 270 evaluates AMA_Y over time to determine a metric value 272. The metric 270 implements a narrow threshold 274 centered at AMA_Y=0 and has only a slight bandwidth above and below that value. During normal driving conditions, AMA_Y would be expected to oscillate above and below the narrow bandwidth of the threshold 274. The metric 270 is triggered ON and outputs a Boolean one when the metric value 272 crosses into the threshold 274 and remains ON while the metric is within the bandwidth of the threshold.

In the example condition shown in FIG. 9, the metric value 272 crosses the threshold 274 and remains within its bandwidth for a particularly long amount of time. These crossings into and out of the threshold 274 are indicated at 276. For the duration of time that the metric value 272 remains within the threshold 274, the AMA_Y airborne classification metric 270 is triggered ON and outputs a Boolean one to AND block 252. Once triggered ON, the Boolean one output of the AMA_Y airborne classification metric 270 is maintained until the metric value 272 leaves the threshold 274.

From this, it can be seen that the AMA_Y airborne classification metric 270 classifies a vehicle airborne condition in response to vehicle Y-Axis accelerations remaining within the threshold 274 which hovers around zero. This is in keeping with what would be expected of an airborne vehicle. While the vehicle is on the driving surface, lateral (Y-Axis) accelerations are expected. When the vehicle goes airborne, those accelerations are expected to decrease dramatically due to the loss of contact between the vehicle and the driving surface. By tuning the bandwidth of the threshold 274, the AMA_Y airborne classification metric 270 can accurately classify a vehicle airborne condition.

AMA-X Airborne Classification Metric

The AMA_X airborne classification metric 280 evaluates AMA_X over time to determine a metric value 282. The metric 280 implements a narrow threshold 284 centered at AMA_X=0 and has only a slight bandwidth above and below that value. During normal driving conditions, AMA_X would be expected to oscillate above and below the narrow bandwidth of the threshold 284. The metric 280 is triggered ON and outputs a Boolean one when the metric value 282 crosses into the threshold 284 and remains ON while the metric is within the bandwidth of the threshold.

In the example condition shown in FIG. 9, the metric value 282 crosses the threshold 284 and remains within its bandwidth for a particularly long amount of time. These crossings into and out of the threshold 284 are indicated at 286. For the duration of time that the metric value 282 remains within the threshold 284, the AMA_X airborne classification metric 280 is triggered ON and outputs a Boolean one to AND block 252. Once triggered ON, the Boolean one output of the AMA_X airborne classification metric 280 is maintained until the metric value 282 leaves the threshold 284.

From this, it can be seen that the AMA_X airborne classification metric 280 classifies a vehicle airborne condition in response to vehicle X-Axis accelerations remaining within the threshold 284 which hovers around zero. This is in keeping with what would be expected of an airborne vehicle. While the vehicle is on the driving surface, longitudinal (X-Axis) accelerations are expected. When the vehicle goes airborne, those accelerations are expected to decrease dramatically due to the loss of contact between the vehicle and the driving surface. By tuning the bandwidth of the threshold 284, the AMA_X airborne classification metric 280 can accurately classify a vehicle airborne condition.

D-RATE Airborne Classification Metric

The D_RATE airborne classification metric 290 evaluates D_RATE over time to determine a metric value 292. The metric 290 implements a narrow threshold 294 centered at D_RATE=0 and has only a slight bandwidth above and below that value. During normal driving conditions, D_RATE would be expected to oscillate above and below the narrow bandwidth of the threshold 294. The metric 290 is triggered ON and outputs a Boolean one when the metric value 292 crosses into the threshold 294 and remains ON while the metric is within the bandwidth of the threshold.

In the example condition shown in FIG. 9, the metric value 292 crosses the threshold 294 and remains within its bandwidth for a particularly long amount of time. These crossings into and out of the threshold 294 are indicated at 296. For the duration of time that the metric value 292 remains within the threshold 294, the D_RATE airborne classification metric 290 is triggered ON and outputs a Boolean one to AND block 252. Once triggered ON, the Boolean one output of the D_RATE airborne classification metric 290 is maintained until the metric value 292 leaves the threshold 294.

From this, it can be seen that the D_RATE airborne classification metric 290 classifies a vehicle airborne condition in response to vehicle roll accelerations remaining within the threshold 294 which hovers around zero. This is in keeping with what would be expected of an airborne vehicle. While the vehicle is on the driving surface, roll accelerations about the X-Axis are expected. When the vehicle goes airborne, those accelerations are expected to decrease dramatically due to the loss of contact between the vehicle and the driving surface. By tuning the bandwidth of the threshold 294, the D_RATE airborne classification metric 290 can accurately classify a vehicle airborne condition.

Airborne Classification

The outputs of the AMA airborne classification metrics 260, 270, 280, 290 are provided to AND block 252. As shown in FIG. 9, in the event of an vehicle airborne condition, these metrics would be ON and output Boolean ones at or about at the same time, or at times which at least partially overlap each other. Thus, in the event of a vehicle airborne condition, AND block 252 will be triggered ON and output a Boolean one for at least a portion of the airborne vehicle event.

The output of AND block 252 is provided to calibratable time classification block 254, which is triggered ON and outputs a Boolean one, which indicates that an airborne vehicle condition has been classified at block 256. The time classification block 254 remains on for a predetermined period of time, which can be tuned or calibrated to achieve the desired performance and/or response. This tuning can be vehicle platform specific, can be selected to meet desired manufacturer performance requirements, and can be selected in accordance with government and/or industry standards. The vehicle airborne classification at block 256 remains ON for the calibrated/tuned time period of block 254.

Airborne Confirmation Algorithm

Referring to FIG. 10, an ACU airborne confirmation algorithm 300 is implemented by the ACU 50. The algorithm 250 utilizes the ACU_Z accelerometer 56 (see FIG. 2) to confirm the airborne condition of the vehicle 12 classified by the airborne classification algorithm 250 (see FIG. 9). To do so, the algorithm 300 implements an AMA_Z airborne confirmation metric 310, which is illustrated graphically in FIG. 10.

AMA-Z Airborne Confirmation Metric

The AMA_Z airborne confirmation metric 310 can be similar or identical to the AMA_Z airborne classification metric 260 (see FIG. 9), with the exception of its threshold determination. The AMA_Z airborne confirmation metric 310 evaluates AMA_Z over time to determine a metric value 312. The AMA_Z airborne confirmation metric 310 adds the effects of gravity (−1 g) from the measured acceleration so that the metric value 312 is zero when the vehicle is airborne. During normal driving on a smooth surface, the AMA_Z airborne confirmation metric 310 will therefore hover at or about −1 g. When the vehicle 12 launches to go airborne, it undergoes a steep rise in AMA_Z, as shown at the left of the metric value 312. Once airborne, the metric value 312 plateaus at or about 0 g. When the vehicle 12 descends, AMA_Z falls, as does the metric value 312 shown to the right of the plateau. When the vehicle 12 lands, a sharp spike in the metric value 312 below −1 g is shown, followed by an immediate bounce upward.

The AMA_Z airborne confirmation metric 310 is configured to evaluate a metric value 312 in order to determine a vehicle landing after being airborne. To do this, AMA_Z airborne confirmation metric 310 implements a threshold 314, which extends below the −1 g AMA_Z value and has a bandwidth selected to extend a predetermined amount, which is tunable, below that −1 g value. The AMA_Z airborne confirmation metric 310 is triggered as indicated at 316, when the metric value 312 crosses through the threshold. The metric value 312 crossing through the threshold 314 is initiated when the metric value first crosses into the threshold and completed when the metric value passes below the threshold, again as indicated at 316. When the AMA_Z airborne confirmation metric 310 detects the vehicle 12 landing, it is triggered ON and outputs a Boolean one indicating that the airborne vehicle condition is confirmed, as indicated at block 318. The vehicle airborne condition confirmed indication 318 is passed to AND block 334. The vehicle airborne classified determination 256 (see FIG. 9) is also passed to AND block 334.

The airborne confirmation algorithm 300 also implements an R_ANGLE off-road classification metrics 320, illustrated graphically in FIG. 10, to determine an off-road condition of the vehicle 12. A determination that the vehicle 12 is in an off-road condition inhibits the algorithm 300 from determining a vehicle airborne condition. In other words, for an airborne determination to be made, the vehicle must not be determined to be off-road.

The R_ANGLE off-road classification metric 320 evaluates R_ANGLE over time to determine a metric value 326. If the metric value 326 crosses an upper threshold 322, as indicated at 328, and a lower threshold 324, as indicated at 330, in any order within a predetermined time period, the R_ANGLE off-road classification metric 320 is triggered ON and outputs a Boolean one indicating a vehicle off-road classified determination.

The output of the R_ANGLE off-road classification metric 320 is passed to NOT block 332, the output of which is passed to AND block 334. When the airborne classified 256 and airborne confirmed 318 determination are both triggered ON, and the vehicle off-road classified determination is NOT triggered ON (NOT block 332 ON), the AND block 334 is triggered ON and outputs a Boolean one indicating that an airborne vehicle condition is determined and an actuate ACR command is issued, as shown at block 336. The ACU 50 is configured to actuate the ACR 60 (see FIG. 2) in response to airborne determined actuate ACR block 336.

From the above description of the invention, those skilled in the art will perceive improvements, changes and modifications to the disclosed system and methods that fall within the spirit and scope of the invention. These improvements, changes, and/or modifications are intended to be covered by the appended claims.

Having described the invention, the following is claimed:

1. A vehicle safety system for a vehicle, comprising:
an actuatable controlled restraint (ACR) including a seatbelt for restraining a vehicle occupant, the ACR being actuatable to control payout and retraction of the seatbelt; and
a controller configured to determine operating conditions of the vehicle and to control the actuation of the ACR in response to the determined operating conditions of the vehicle,
wherein the ACR has a normal restraint condition and an enhanced restraint condition,
wherein the controller is configured to implement a longitudinal acceleration airborne classification algorithm for classifying vehicle airborne conditions in response to vehicle longitudinal accelerations measured along a vehicle X-axis,
wherein the controller is configured to implement a lateral acceleration airborne classification algorithm for classifying vehicle airborne conditions in response to vehicle lateral accelerations measured along a vehicle Y-axis,
wherein the controller is configured to implement a vertical acceleration airborne classification algorithm for classifying vehicle airborne conditions in response to vehicle vertical accelerations measured along a vehicle Z-axis,
wherein the controller is configured to implement a roll acceleration airborne classification algorithm for classifying vehicle airborne conditions in response to vehicle roll accelerations measured about the vehicle X-axis, and
wherein the controller is configured to actuate the ACR from the normal restraint condition to the enhanced restraint condition in response to determining abnormal driving conditions of the vehicle based at least on the classified vehicle airborne conditions.

2. The vehicle safety system recited in claim 1,
wherein the ACR in the normal restraint condition is configured to apply a comparatively light retraction force sufficient to take up seatbelt webbing and tension the seatbelt across the occupant while, at the same time, being configured to payout the seatbelt webbing in response to occupant movement, and
wherein the ACR in the enhanced restraint condition is configured to increase the retraction force applied to the seatbelt webbing and to increase a resistance to seatbelt webbing payout in response to occupant movement.

3. The vehicle safety system recited in claim 1, wherein the controller is an airbag controller (ACU) comprising:

an ACU_X accelerometer configured to measure vehicle accelerations along the vehicle X-axis and generate a signal indicative thereof;

an ACU_Y accelerometer for measuring vehicle accelerations along the vehicle Y-axis and generate a signal indicative thereof;

an ACU_Z accelerometer for measuring vehicle accelerations along the vehicle Z-axis and generate a signal indicative thereof; and a ROLL sensor for measuring vehicle roll accelerations about the vehicle X-axis of the vehicle and producing generate a signal indicative thereof, and wherein the ACU is configured to determine the abnormal driving conditions of the vehicle in response to the signals from the ACU_X, ACU_Y, ACU_Z, and ROLL sensors.

4. The vehicle safety system recited in claim 1, wherein the controller is configured to implement a vertical acceleration airborne confirmation algorithm for confirming the vehicle airborne condition in response to vehicle vertical accelerations measured along the vehicle Z-axis.

5. The vehicle safety system recited in claim 4, wherein the vertical acceleration airborne confirmation algorithm is configured to determine a landed condition of the vehicle in response to vehicle vertical accelerations measured along the vehicle Z-axis.

6. The vehicle safety system recited in claim 4, wherein the controller is configured to determine the vehicle airborne condition in response to classifying the vehicle airborne condition and confirming the vehicle airborne condition.

7. The vehicle safety system recited in claim 6, wherein the controller is configured to determine the vehicle airborne condition further in response to determining that a vehicle off-road condition has not been determined.

8. The vehicle safety system recited in claim 7, wherein the controller is configured to implement an R_ANGLE off-road classification metric to classify the vehicle off-road condition, the R_ANGLE off-road classification metric evaluating a vehicle R_ANGLE over time and classifying the vehicle off-road condition in response to the R_ANGLE crossing both an upper threshold and a lower threshold within a predetermined amount of time in any order.

9. A vehicle safety system for a vehicle, comprising:

an actuatable controlled restraint (ACR) including a seatbelt for restraining a vehicle occupant, the ACR being actuatable to control payout and retraction of the seatbelt; and a controller configured to determine operating conditions of the vehicle and to control the actuation of the ACR in response to the determined operating conditions of the vehicle, wherein:

the ACR has a normal restraint condition and an enhanced restraint condition;

the controller is configured to implement a longitudinal acceleration airborne metric that evaluates vehicle longitudinal accelerations measured along a vehicle X-axis over time, the longitudinal acceleration airborne metric defining a threshold having a predetermined bandwidth that extends above and below a zero of the longitudinal acceleration, wherein the longitudinal acceleration airborne metric is configured to determine that the vehicle is in a vehicle airborne condition in response to a magnitude of the longitudinal acceleration exceeding and falling back within the threshold, the longitudinal acceleration airborne metric maintaining the vehicle airborne condition determination while the longitudinal acceleration remains within the threshold;

the controller is configured to implement a lateral acceleration airborne metric that evaluates vehicle lateral accelerations measured along a vehicle Y-axis over time, the lateral acceleration airborne metric defining a threshold having a predetermined bandwidth that extends above and below a zero of the lateral acceleration, wherein the lateral acceleration airborne metric is configured to determine that the vehicle is in the vehicle airborne condition in response to a magnitude of the lateral acceleration exceeding and falling back within the threshold, the lateral acceleration airborne metric maintaining the vehicle airborne condition determination while the lateral acceleration remains within the threshold;

the controller is configured to implement a roll acceleration airborne metric that evaluates vehicle roll accelerations measured about the vehicle X-axis over time, the roll acceleration airborne metric defining a threshold having a predetermined bandwidth that extends above and below a zero of the roll acceleration, wherein the roll acceleration airborne metric is configured to determine that the vehicle is in the vehicle airborne condition in response to a magnitude of the roll acceleration exceeding and falling back within the threshold, the roll acceleration airborne metric maintaining the vehicle airborne condition determination while the roll acceleration remains within the threshold;

the controller is configured to implement a vertical acceleration airborne metric that evaluates vehicle vertical accelerations measured along a vehicle Z-axis over time, the vertical acceleration airborne metric defining a threshold having a predetermined bandwidth that extends above and below a zero of the vertical acceleration, wherein the vertical acceleration airborne metric is calibrated to compensate for the effects of gravity, wherein the vertical acceleration airborne metric is configured to determine that the vehicle is in the vehicle airborne condition in response to the vertical acceleration crossing into the threshold, the vertical acceleration airborne metric maintaining the vehicle airborne condition determination while the vertical acceleration remains within the threshold, and the controller is configured to actuate the ACR from the normal restraint condition to the enhanced restraint condition in response to determining that the vehicle is in the vehicle airborne condition.

10. The vehicle safety system recited in claim 9, wherein the controller is configured to classify the vehicle airborne condition in response to determining that all of the following are true at the same time:

the longitudinal acceleration airborne metric determines that the vehicle is in the vehicle airborne condition;

the lateral acceleration airborne metric determines that the vehicle is in the vehicle airborne condition;

the vertical acceleration airborne metric determines that the vehicle is in the vehicle airborne condition; and the roll acceleration airborne metric determines that the vehicle is in the vehicle airborne condition.

11. The vehicle safety system recited in claim 10, wherein the controller is configured to maintain the vehicle airborne condition classification for a predetermined period of time.

12. The vehicle safety system recited in claim 10, wherein the controller is configured to implement a vertical acceleration airborne confirmation metric that evaluates vehicle vertical accelerations measured along the vehicle Z-axis over time, the metric defining a threshold having a predetermined bandwidth selected so that the vertical acceleration passes through the bandwidth in response to landing after having been airborne, the controller being configured to confirm the vehicle airborne condition in response thereto.

13. The vehicle safety system recited in claim 12, wherein the controller is configured to determine the vehicle airborne condition in response to classifying the vehicle airborne condition and confirming the vehicle airborne condition.

14. The vehicle safety system recited in claim 1, wherein the controller includes an airbag controller unit (ACU) configured to control the actuation of one or more airbags and the ACR.

* * * * *